US009126686B2

(12) United States Patent
Seibt

(10) Patent No.: US 9,126,686 B2
(45) Date of Patent: Sep. 8, 2015

(54) DRAINING SYSTEM HAVING AN ODOR SEAL FOR A VACUUM TOILET DRAIN SYSTEM

(75) Inventor: Christian Seibt, Buchholz (DE)

(73) Assignee: Airbus Operations GmbH (DE)

( * ) Notice: Subject to any disclaimer, the term of this patent is extended or adjusted under 35 U.S.C. 154(b) by 1409 days.

(21) Appl. No.: 12/012,234

(22) Filed: Jan. 31, 2008

(65) Prior Publication Data

US 2008/0201832 A1    Aug. 28, 2008

Related U.S. Application Data

(60) Provisional application No. 60/898,646, filed on Jan. 31, 2007.

(30) Foreign Application Priority Data

Jan. 31, 2007    (DE) .......................... 10 2007 004 832

(51) Int. Cl.
| | | |
|---|---|---|
| E03D 11/00 | (2006.01) | |
| B64D 11/02 | (2006.01) | |
| E03D 11/18 | (2006.01) | |
| E03F 1/00 | (2006.01) | |

(52) U.S. Cl.
CPC ................ *B64D 11/02* (2013.01); *E03D 11/18* (2013.01); *E03F 1/006* (2013.01); *Y02T 50/46* (2013.01)

(58) Field of Classification Search
USPC .............. 137/843, 845, 846, 853; 4/431, 316, 4/300, 449, 301, 426, 309, 427; 222/494
See application file for complete search history.

(56) References Cited

U.S. PATENT DOCUMENTS

| | | | | |
|---|---|---|---|---|
| 2,793,371 | A * | 5/1957 | Levesconte | 137/844 |
| 3,047,013 | A * | 7/1962 | Baumbach | 137/849 |
| 3,262,132 | A * | 7/1966 | Mann | 4/427 |
| 3,923,210 | A * | 12/1975 | Jackson | 222/494 |
| 4,030,142 | A * | 6/1977 | Wolfe | 623/2.34 |
| 4,040,444 | A * | 8/1977 | Nolan | 137/561 A |
| 4,086,668 | A * | 5/1978 | Tubbs | 4/425 |
| 4,376,314 | A * | 3/1983 | Iwans | 4/431 |
| 4,521,925 | A * | 6/1985 | Chen et al. | 4/362 |
| 4,783,859 | A * | 11/1988 | Rozenblatt et al. | 4/316 |
| 5,205,325 | A * | 4/1993 | Piper | 137/844 |
| 5,474,099 | A * | 12/1995 | Boehmer et al. | 137/15.18 |
| 6,702,255 | B2 * | 3/2004 | Dehdashtian | 251/149.3 |

FOREIGN PATENT DOCUMENTS

| | | |
|---|---|---|
| EP | 0217185 | 4/1987 |
| EP | 1255065 | 11/2002 |
| WO | 2006106485 | 10/2006 |

* cited by examiner

*Primary Examiner* — Lauren Crane

(74) *Attorney, Agent, or Firm* — Lerner, David, Littenberg, Krumholz & Mentlik, LLP

(57) ABSTRACT

A draining system having an odor seal for a vacuum toilet drain system in which a flexible hose acts as an odor seal. As a result of the flexible hose, propagation of odors can be prevented when the hose collapses flat, for example as a result of its intrinsic weight, and consequently there is no longer a flow-through cross section, wherein, however, drainage of liquids remains possible.

15 Claims, 8 Drawing Sheets

DRAINING SYSTEM HAVING AN ODOR SEAL FOR A VACUUM TOILET DRAIN SYSTEM

CROSS-REFERENCE TO RELATED APPLICATIONS

This application claims the benefit of the filing date of U.S. Provisional Patent Application No. 60/898,646 filed Jan. 31, 2007, the disclosure of which is hereby incorporated herein by reference.

BACKGROUND OF THE INVENTION

The invention relates to a draining system for a vacuum toilet drain system, in particular to a draining system having an odor seal for a vacuum toilet drain system for an aircraft, and to a corresponding aircraft comprising such a draining system having an odor seal.

In known flushing devices for a vacuum toilet comprising, for example, a urinal, after use of the urinal, first the supply of flushing liquid to the urinal takes place, followed by the opening of a suction valve in order to lead urine, flushing liquid and other impurities into the region of a waste water tank. Often a closing valve is provided in the train of waste water pipes so as to control the suction process or so as, during the suction process, to acoustically seal the waste water system off from the vacuum system. Frequently, banking up in the drain system occurs, for example as a result of malfunction of the shut-off valve or as a result of impurities or dirt build-up so that, as a rule, an overflow device is provided in order to prevent banking up in the urinal, wherein this overflow has to be fed into the drain system again at some location or other so as to reliably lead away any overflowing liquid. In this arrangement, both an overflow and a main drain must make it possible for a liquid to be able to reliably drain away, and, furthermore, must ensure sealing-off of odors from the waste water system or drain system. Moreover, a drain which joins the waste water system must prevent extraneous air from being sucked in, because otherwise the functionality of the vacuum drain system cannot be ensured.

SUMMARY OF THE INVENTION

There may be a need to provide a draining system that reduces the noise emission and odor emission generated.

The need may be fulfilled by the subject of the independent claims, wherein advantageous improvements of the invention are embodied in the subordinate claims.

According to an exemplary embodiment of the invention, a draining system for a vacuum toilet drain system for an aircraft is provided, wherein the draining system comprises a first connection device for connection to a drain; a second connection device for the downstream connection to a drain pipe system; and an odor seal that is arranged between the first connection device and the second connection device, wherein the odor seal comprises a flexible hose with an inlet region, a middle region with two opposing interior wall regions, and an outlet region, wherein the middle region of the hose, as far as its cross-sectional geometry is concerned, both in a state where there is no pressure difference between the inlet region and the outlet region, and in a negative-pressure state in the outlet region, is present in a first cross-sectional shape in which the two interior wall regions lie on top of each other such that the cross-sectional geometry does not permit any gas exchange, and the hose, as a result of an upstream hydrostatic pressure of the liquid, can be brought from the first cross-sectional shape to a second cross-sectional shape in which the two interior wall regions are spaced apart from each other such that the passing of liquid in the downstream direction is made possible.

With such an arrangement, by means of simple mechanical components, both an odor- and sound-proof or odor- and sound-deadening sealing device in a draining system is created, and a low-maintenance essentially non-wearing valve-like arrangement is provided which makes possible problem-free draining of liquid solely as a result of the hydrostatic pressure. Such an arrangement is comparatively easy to produce, has no movable parts that involve bearings, and is essentially resistant to alkaline solutions, salt water and acids, so that only little maintenance is to be expected in such a draining system.

According to an exemplary embodiment of the invention, the hose essentially comprises a material from the group that includes Teflon, latex, silicone, caoutchouc or a mixture of the above-mentioned materials.

These materials are essentially resistant to alkaline solutions, acids and salt water; they feature good flexibility and long-term stability, even with frequent movement, as well as featuring good ageing resistance.

According to an exemplary embodiment of the invention, upstream of the middle part a further liquid feed-in is provided in order to feed in a flushing liquid for flushing the middle part.

Such a liquid feed-in in addition to the waste water feed-in makes it possible not only at regular intervals to feed in a flushing liquid for flushing the middle part, for example so as to prevent drying out and thus sticking together of the interior wall regions, but also, for example after waste water has flown through, to flush away, for example, solids particles that could have a negative effect on the sealing function of the draining system.

According to an exemplary embodiment of the invention, at least one of the two opposing interior wall regions, at least in some sections, comprises an anti-adhesive coating.

Such an anti-adhesive coating prevents particles from being lodged in the sealing region of the opposing interior wall regions. In this arrangement both opposing interior wall regions can comprise an anti-adhesive coating, wherein, however, it is also possible to provide a type of coating that is only provided on one of the two opposing interior wall regions, for example if the aim is only to prevent the opposing interior wall regions from sticking together.

According to an exemplary embodiment of the invention, the coating is a fluid sliding means.

Such a sliding means can, for example, be a lubricant, for example a Teflon-based high-performance grease or sliding grease that features hydrophobic behaviour also to acids, alkaline solutions and saltwater so that dislodging or dissolving of the sliding means as a result of the action of the waste water can essentially be prevented.

According to an exemplary embodiment of the invention, the hose is designed such that the first cross-sectional shape is taken up as a result of the intrinsic weight of the hose.

In this arrangement the hose comprises, for example, a highly flexible material with a corresponding wall thickness that makes it possible for the hose to collapse flat, due to its intrinsic weight, so that the two opposing interior wall regions of the middle part seal the cross section off. In particular, it is also possible to provide a variable wall thickness, for example in the form of elongated recesses in the hose, so as to provide corresponding predetermined folding points. In this arrangement, corresponding gussets will, as a rule, collect residual fluids which due to capillary action seal off the remaining open cross section in the gussets. For example silicone is a particularly suitable material for the hose. With the use of this material, a ratio of wall thickness to hose circumference of approximately 1:100 has been proven to be suitable. For an overflow comprising, for example, a half-inch connection with a circumference of approximately 40 mm to 50 mm, a wall thickness of ¼ mm to ½ mm could be provided. For a main drain comprising a diameter of 1 inch to 2 inch and a circumference of 80 mm to 200 mm, a wall thickness of approximately 1 mm could be provided. However, concrete dimensioning of the wall thickness and the hose circumference will be determined by a person skilled in the art, depending on the expected flow-through quantities and the rigidity of the hose material.

According to an exemplary embodiment of the invention, the hose is designed such that the first cross-sectional shape is at least in part assumed by pre-tension in at least one part of the hose cross section.

In this arrangement the hose can comprise corresponding pre-forming that exerts a certain pre-tension force at least to parts of the opposing interior wall regions so that closing of the draining system in the middle region is reliably ensured even at low gravitation as can occur, for example, in various flight manoeuvres. Pre-forming can, for example, also be achieved by a spring element that has been inserted in the wall of the hose, for example a spring, which at the predetermined buckling points makes the hose assume the first cross-sectional shape already as a result of the spring force.

According to an exemplary embodiment of the invention, in the middle part the two opposing interior wall regions are connected in lateral connection regions such that they lie on top of each other in the connection regions.

The aforesaid can, for example, be achieved in that the internal cross section of the hose is not of a circular, elliptic or oval design, but is instead, for example, in the shape of a droplet that on both ends tapers off to a point, so that the formation of gussets can to a very large extent be prevented when the middle region is in the first cross-sectional shape. Such an internal cross-sectional diameter of the hose can, for example, be produced in that a strip-shaped material is cut with a blade in the direction of the direction of expansion of the strip, such that the opposing internal wall regions that are created in this cutting process, at the slit that is created during cutting, in a first cross-sectional shape lie completely on top of each other and, for example as a result of the hydrostatic pressure of a liquid, in the second cross-sectional shape are spaced apart from each other at least in the middle region.

According to an exemplary embodiment of the invention, in the middle region the hose is elastic in cross section and is laterally clamped in order to in this way assume the first cross-sectional shape.

In this way the forming of gussets can to a very large extent be prevented even with a circular, oval or elliptic internal cross section of the hose, because these regions are essentially sealed off because of clamping. By means of corresponding pre-tension during clamping, the closing force of the hose can be preset, depending on the requirements that the draining system has to meet. Such clamping can be achieved not only by external elements but also by tension elements or spring elements that are located in the wall of the hose in the middle region.

According to an exemplary embodiment of the invention, a drain system comprising a draining system according to the invention is provided, wherein the drain system comprises a drain pipe system with a first connection that can be connected to a bowl of a vacuum toilet, and with a second connection that can be connected to a vacuum system, and with a drain connection for the second connection device of the draining system, which drain connection is provided downstream in front of the second connection.

In this way a draining liquid moving through the draining system can bypass a drain region that may be blocked or dirty as a result of a malfunction.

According to an exemplary embodiment of the invention, the drain system comprises a closing device that is provided in the drain pipe system between the first and the second connection, wherein the drain connection for the second connection device is provided downstream behind the closing device.

In this way the draining system can bypass a closing device that may be provided, which can prevent considerable operational disruption if there is a malfunction of the closing device, in particular if the drain device acts as an overflow.

According to an exemplary embodiment of the invention, a vacuum toilet with a drain system according to the invention is provided.

According to an exemplary embodiment of the invention, a vacuum urinal with a drain system according to the invention is provided.

According to an exemplary embodiment of the invention, an aircraft comprising a toilet or a urinal with a drain system according to the invention is provided. The individual characteristics of the exemplary embodiments can, of course, also be combined.

These and other aspects become clear with reference to the drawings described below.

BRIEF DESCRIPTION OF THE DRAWINGS

Below, exemplary embodiments of the invention are described with reference to the drawings.

DETAILED DESCRIPTION

Figure 1:
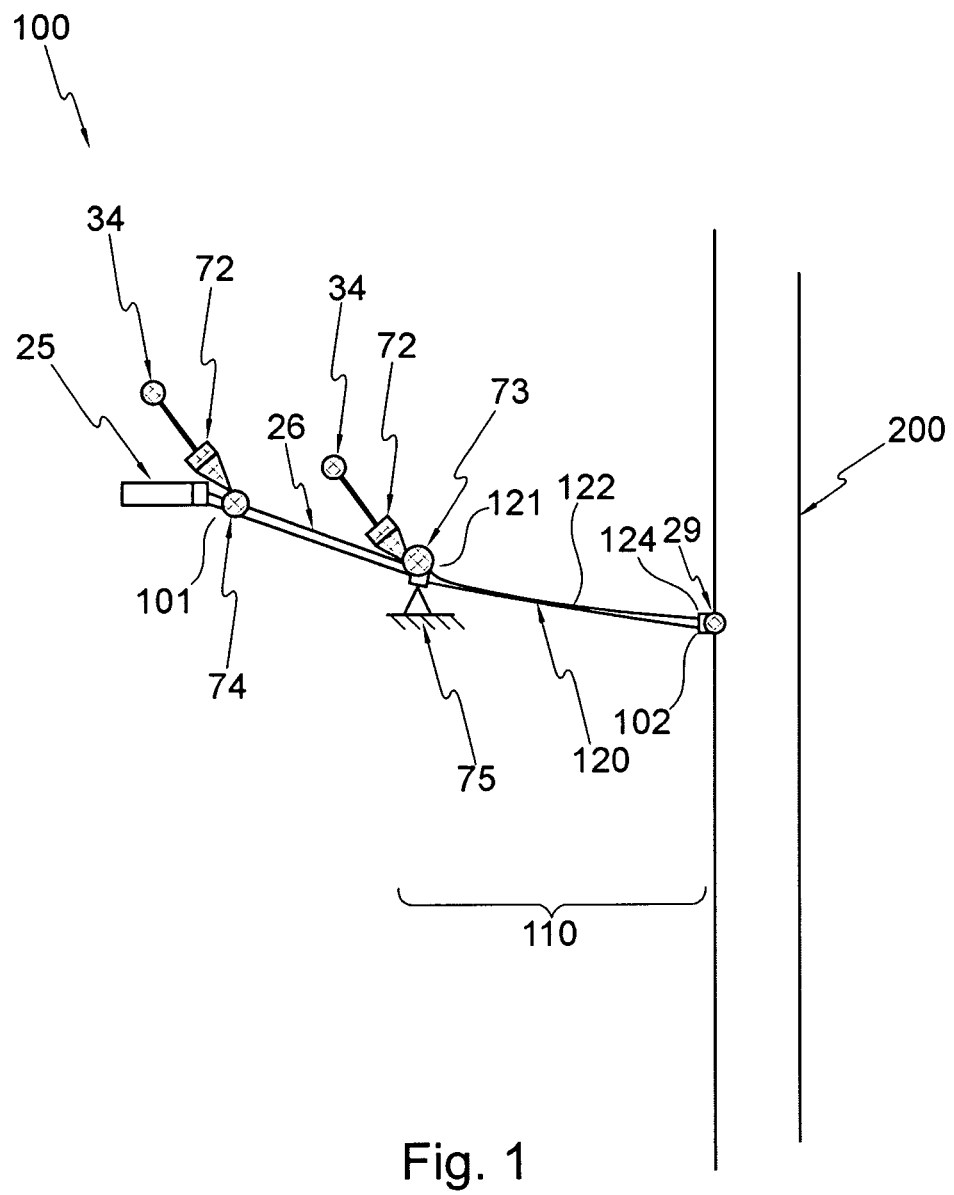
FIG. 1 shows an exemplary embodiment of a draining system according to the invention, having an odor seal.

FIG. 1 shows an exemplary embodiment of a draining system having an odor seal for a vacuum toilet drain system. In this arrangement the draining system 100 comprises a first connection device 101 for connection to a drain 25 that can be provided on a bowl (not shown) of a urinal. Furthermore, a second connection device 102 is provided, which on a drain connection location 29 discharges into a vacuum drain system 200. The draining system 100 further comprises an odor seal 110 that is provided between the first connection device 101 and the second connection device 102. The odor seal 110 comprises a flexible hose 120 that comprises an inlet region 121 and an outlet region 124. Between the inlet region 121 and the outlet region 124 a middle region 122 is provided that comprises two opposing internal wall regions 123 (for the sake of clarity not shown in detail in FIG. 1).

The principle of the odor seal is based on a pressure hose which, as long as it is not full, collapses flat across the hose cross section. In contrast to a suction hose, which permanently maintains its tubular shape, the pressure hose is designed to contract across the cross section during the suction process, i.e. when a suction valve 17 opens. As a result of this, air cannot be sucked in from the drain 25, and annoying flow noises are prevented.

During atmospheric conditions on a drain inlet point to which a first connection device 101 is connected, the hose 120, due to its, for example, flat shape (for example oval or elliptic) is closed and prevents unpleasant odors rising from the drain system 200 by way of the drain 25. When liquid drains away from a urinal bowl, the hose opens as a result of the speed of the liquid flowing along a gradient of a drain conduit 26 that can be provided as a starting segment so that the liquid has reached a certain speed when it runs into the hose 120, in particular into the inlet region 121. In the case of liquid banking up upstream of the hose odor seal, the hose opens as a result of the hydrostatic pressure. The design thus requires an adequate gradient between the drain 25 and the drain inlet conduit 29 on the drain system 200.

The design of the hose diameter, of the length and of the hose wall thickness must take into account the flow resistance of the starting segment 26, of the hose 120 and of the inlet 121. In this arrangement, the hose length from a drain inlet point on the first connection device 101 to a fixed bearing 75 on which the inlet region 121 of the hose 120 can be provided can also be decisive. Furthermore, the hose material can also be relevant in relation to the flow resistance. In this arrangement, a corresponding selection of the hose length, the wall thickness and the material can prevent the formation of water pockets, with the above being determined as required by circumstances by a person skilled in the art.

The hose can be made from various materials and combinations thereof. The hose material can, for example, be made from Teflon, latex, silicone hose, caoutchouc or other elastic plastics, or from a mixture thereof. A silicone hose provides, for example, an operating temperature range of −60° C. to +200° C., which makes it a suitable choice for aviation applications.

The starting segment or the drain conduit 26 can be made from a tubular material such as plastic, stainless steel or titanium. The material of the hose odor-seal 110 should prevent the walls of the hose from sticking together. In this arrangement preventative lubrication of the interior walls of the hose with a special sliding means can be provided. The sliding means can be a liquid, in order to lubricate the hose during subsequent maintenance work by way of a drain, or a grease, for example a Teflon-based high-performance grease or sliding grease with a temperature range of −50° C. to +230° C. Such a grease is, for example, highly resistant to acids, alkaline solutions and salt water.

Complete drainage of the draining system can be achieved by a corresponding gradient between the drain 25 and the inlet point 29 into the drain system. Any expansion caused by residual liquid can be compensated for by the flexibility of the hose material. By means of the system of the inventive draining system having an odor seal, odors emanating from the drain system can be prevented, and flow noises can be reduced.

Furthermore, optionally, on the draining system a flushing-water supply device 34 can be provided that can be provided at various locations 73, 74. In this arrangement, by way of an injection nozzle 72, flushing water can be fed to the draining system or to the hose odor-seal. For example, after each drainage process, the hose odor-seal can automatically be cleaned in order to reliably maintain the function. Position 73 or position 74 can be the flushing-in position; the latter in particular if cleaning of the conduit 26 is to be achieved.

Figure 2:
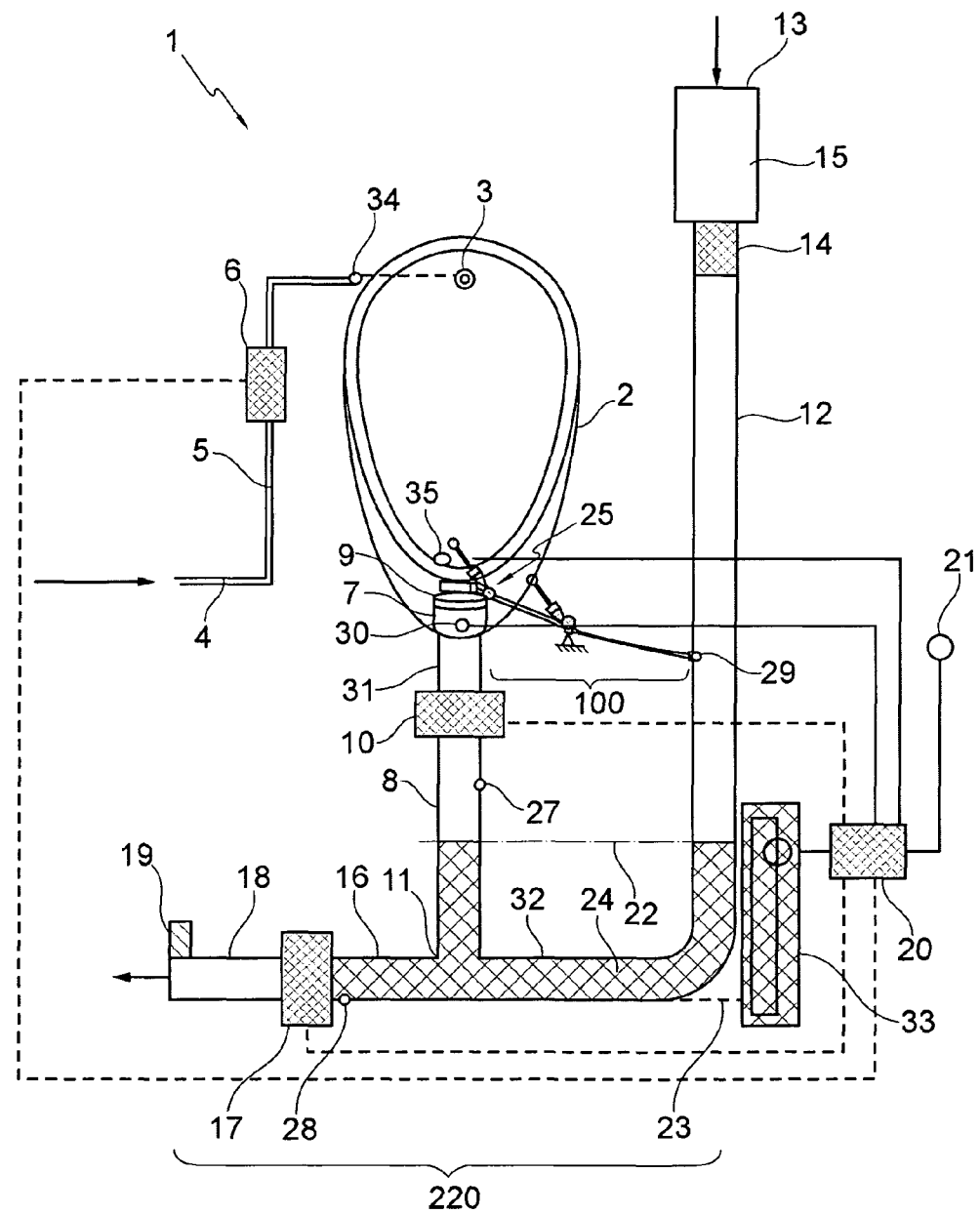
FIG. 2 shows an exemplary embodiment of a drain system according to the invention.

FIG. 2 shows a system 1 for flushing a vacuum toilet. The vacuum toilet comprises a urinal bowl 2 comprising a flush ring or flush jet(s) 3. The flush ring or flush jet(s) 3 is/are expediently arranged in the region of an upper delimitation, in perpendicular direction, of the urinal bowl 2. Flushing water is delivered, by way of a flushing-water supply conduit 4, a flush conduit 5 and a flush valve 6, to the flush ring or flush jet(s) 3 when the flush valve 6 is opened. During a flushing process the flush valve 6 is opened, and flushing water is sprayed into the urinal bowl 2 by way of a flush ring or flush jet(s) 3.

In the closed state of the flush valve 6 no flushing water is supplied to the flush ring or flush jet(s) 3.

As shown in FIG. 2, the urinal bowl 2 comprises a drain 7, which is connected to a drain conduit 8. According to this exemplary embodiment, downstream of the drain 7 of the urinal bowl 2 a sieve 9 and a shut-off valve are provided, with the latter also acting as an odor seal. Other devices for separating out conveyed matter that must not find its way from the urinal bowl 2 into the drain conduit of the urinal bowl 31 can also be used.

The drain conduit 8 discharges into a bypass conduit 12 by way of a coupling 11. As shown in FIG. 1, the bypass conduit 12 has a predetermined incline in order to transport material to be conveyed, urine and flushing water under gravitational action in the direction of the end of the bypass conduit 12 to the suction valve 17. The end 13 of the bypass line 12, which end points to the surroundings, has an odor seal 14 and a suction silencer 15. The odor seal 14 and the suction silencer 15 are located upstream of the coupling 11. According to the exemplary embodiment, the arrangement of the suction silencer 15 and of the odor seal 14 is such that an air inlet opening of the suction silencer 15 and of the odor seal 14 is situated above a maximum possible liquid level. The odor seal 14 is arranged below the suction silencer 15.

Downstream of the coupling 11 the other end 16 of the bypass conduit 12 discharges into a suction valve 17. The suction valve 17 is connected to a waste water conduit 18. The waste water conduit 18 is connected to a vacuum system 19 which generates a vacuum and in the waste water conduit 18 generates a suction stream when the suction valve or the closing device 17 is opened. The suction valve 17 can be opened and closed, and in its open state generates a suction stream in the bypass conduit 12, in particular with the shut-off valve 10 in its closed position.

As shown in FIG. 2 by the dashed lines, the suction valve 17, the shut-off valve 10 and the flush valve 6 are controlled by a control unit 20. The control unit 20 is connected to a sensor 30. A triggering device 21, if applicable manually operated, which is connected to the control unit, can also be used, but this is not mandatory for proper functioning. The triggering device 21 can be a control button that can be activated by a person using the vacuum toilet, in order to trigger the flushing process and subsequently the suction process.

As an alternative, the flushing process can be triggered automatically with the use of a corresponding sensor 30. Flushing can be triggered by detection via a sensor 30 prior to use, when stepping away, prior to use and when stepping away, or when the urinal cover is being closed (functions like the triggering device 21). The duration of flushing, in other words the quantity of flushing water used, can be set so as to be fixed, for example to approximately 3 seconds, and can be controlled according to the duration of use of the urinal, according to the quantity of liquid received by the urinal, and/or according to the conductivity of the urine/water mixture. The duration of use can be measured by way of a sensor 30 that registers the period of time between a person stepping close to the urinal and stepping away from the urinal. The sensor 30 can be a user registration sensor, for example a movement sensor, temperature sensor, distance sensor or a photoelectric barrier. The installation position, angle of view/focal length of the sensor, and its sensitivity should be determined such that the direct user of the urinal is registered. The quantity of liquid discharged into the urinal can be measured at the fill level in the intermediate storage device 32. The higher the fill level the longer the duration of flushing or the larger the quantity of flushing water required in order to achieve a good rinsing effect in the soiled urinal bowl. Measuring the fill level can take place with the use of pressure sensors (measuring the hydrostatic pressure), capacitive fill level sensors, and/or optical fill level sensors. Further measuring methods are also imaginable, depending on demands and requirements. Furthermore, in the intermediate storage device 24 the conductivity of the liquid (urine/water mixture) can be measured. The greater the conductivity and thus the saline content of the liquid (urine/water mixture), the longer the required duration of flushing and thus the larger the quantity of flushing water in order to increase the cleaning effect in the urinal bowl and in order to reduce deposits. This can be registered using a urine/water mixture conductivity sensor that is arranged in the drain region, for example, of a urinal. As far as the selection of materials and the geometry (construction) are concerned, the intermediate storage device 32 can be designed such that measuring through the wall of the intermediate storage device is possible. The different methods of determining the flushing quantities can be combined at will so that flushing according to requirements can be achieved.

In a supplementary manner the geometry of the urinal bowl should support gravity-driven drainage of the liquids from the surface of the urinal bowl. Furthermore, an anti-adhesive surface coating can be used in the urinal bowl so as to improve the draining behaviour.

According to another exemplary embodiment of the invention, the system can also be operated as a "waterless urinal". It is possible that the devices concerning flushing 3, 4, 5 and 6 may then not be required.

According to one embodiment, after the definition of the flushing quantity, the control unit 20 is activated. The control unit 20 determines switching-on times of the flush valve 6, shut-off valve 10 and suction valve 17.

According to the exemplary embodiment shown in FIG. 2, the shut-off valve 10 is opened by way of a sensor 30 when the user steps close to the urinal. If this sensor is not provided, urine flows to the closed shut-off valve 10. The shut-off valve must remain closed before the user steps close to the urinal so that no unpleasant odors can emanate from the urinal. In this case the drain conduit from the urinal bowl 31 should be equipped with a fill-level measuring device similar to the fill-level measuring device 33 in the intermediate storage device 32 so as to prevent overfilling of the drain conduit from the urinal bowl 31. When a maximum fill level in the drain conduit of the urinal bowl 31 has been reached, the shut-off valve 10 should automatically be opened in order to prevent overfilling of the drain conduit from the urinal bowl 31 and consequently overfilling of the urinal bowl. As a result of the open shut-off valve 10 a storage device expansion by the effectively usable storage device volume 24 can take place.

If a sensor is present, the shut-off valve 10 is automatically opened when the user steps close to the urinal, and the liquids can flow into the intermediate storage device 32.

As an alternative, when the user steps close to the urinal the shut-off valve 10 can remain closed in order to prevent any unpleasant odor emanating from the drain conduit from the urinal bowl 31 during use. In this case, again, fill level measuring in the drain conduit from the urinal bowl 31 with automatically opening shut-off valve 10 and, if required, a storage device expansion by the effectively usable storage device volume 24 is sensible.

After use of the urinal, flushing can be manually activated and triggered by the triggering device 21, or automatically in that the user steps away from the urinal. As a result of the flush valve 6 opening for the defined duration of flushing, flushing water is let into the urinal bowl 2 and any impurities that are present are conveyed, by way of the sieve 9, to the intermediate storage device 24 or to the shut-off valve 10. The liquid and any matter to be conveyed are conveyed in a gravity-driven manner by way of the conduits 31, 8 and 16, which have to maintain a gradient, right up to the suction valve 17. The shorter the flushing process the shorter the acoustic exposure (noise) to the passenger in the toilet and to the passengers in the cabin. If a urinal bowl made of stainless steel is used, noise generation as a result of structure-borne sound or airborne sound is particularly pronounced and can primarily be reduced by means of a reduction in the flushing time. For hygiene reasons a minimal duration of flushing for adequate rinsing of the urinal bowl should be set. By means of a variable duration of flushing, flushing water weight can be saved. This results in reduced fuel consumption as a result of a reduction in fresh water that has to be carried along. As an alternative, if the same quantity of flushing water is carried on board, the water saved by variable duration of flushing water, when compared to constant duration of flushing, over a given number of flushing processes can be made available to other on-board devices, for example to a shower. Further suppression in structure-borne sound can be achieved by sound absorption on the urinal bowl 2. Sound absorption mats are, for example, glued to the underside of the urinal.

The suction valve 17 is closed until the point in time of activation. In the case of manual activation by way of the triggering device 21 and non-existing fill level measuring in the drain conduit from the urinal bowl 31 with automatic triggering of the shut-off valve 10, firstly the shut-off valve 10 has to be opened for a defined period of time so that the banked-up liquid can flow into the intermediate storage device 32. In order to prevent unpleasant odors arising upstream of the shut-off valve 10 the maximum fill level 22 in the intermediate storage device 32 should not be exceeded. When the maximum fill level is reached, a reduced automatic suction process of the liquid down to the minimum fill level 23 can take place. In this suction process the suction valve 10 should only be opened to such an extent that the flow sounds at the urinal drain 7 are not excessive.

The shut-off valve 10 is then closed completely, and subsequently the suction valve 17 is opened after a defined time. Due to a pressure difference generated by the vacuum system 19, the air from a sound-insulated secondary structure chamber (sound insulation wall) then flows through the bypass conduit 12 into the intermediate storage device 32 and conveys the liquid and the material that is conveyed with it to the vacuum system 19. As a result of the airstream in the bypass line 12, a closed, for example spring-loaded, odor seal 14 is opened in the direction of flow. After the suction process the spring-loaded odor seal 14 closes again, and unpleasant odors cannot leave the upper end of the bypass conduit 13. The flaps of the nonreturn valve 14 (possibly a butterfly) comprise a special sealing ring all around so as to improve the sealing ability and to prevent arising odors from emanating.

The air supply to the suction valve 17 is sound attenuated by a silencer 15 so that noise emission is suppressed at this point.

The opening duration or the duration during which the suction valve 17 is switched on can be set so as to be fixed (for example one to four seconds) or it can be adjusted to reflect the fill level in the intermediate storage device 32. The method of fill level measuring should be selected such that an adequate number of fill level heights or measuring values can be provided. In this way the duration of the suction process can be set as required, depending on the fill level height. The shorter the suction process, i.e. the lower the fill level in the intermediate storage device 32, the shorter the acoustic disturbance (noise) to which the passenger in the toilet and the passengers in the cabin are exposed. The shut-off valve 10 and the suction valve can also be replaced by a pneumatic or electromechanical pinch valve so as to further reduce flow noises. An automatic flushing and suction process after each use of the urinal is recommended in order to provide the user with feedback of successful use with rinsing. The design of the intermediate storage device 32 can incorporate this aspect. Advantageously, the closing speeds of the valves are such that minimum flow noises are generated. Advantageously, all the conduits are arranged with gradients towards the vacuum system 19, which gradients ensure optimal drainage function.

In order to prevent overfilling of the urinal bowl 2 in the case of a blocked sieve 9 or a defective shut-off valve 10, a drain 25 with an inlet of the liquid into the intermediate storage device is sensible. Various inlet positions in the system according to FIGS. 1 and 2 are imaginable. The drain 25 can optionally comprise a sieve in order to prevent downstream installations and the drain conduit from blocking as a result of coarser particles. The use of a sieve depends on the design of the drain 25 and of the drain conduit 26. Furthermore, it should be ensured that unpleasant odors from the pipe architecture cannot leave the system by way of the drain conduit 26 and the drain 25.

Letting the liquid in at position 27 is possible with fill level measuring in the intermediate storage device, in the drain conduit or in the urinal bowl 31 and with an adequately dimensioned intermediate storage device. The pipe cross section of the drain conduit at the urinal bowl 31 should make it possible to vent the intermediate storage device. With a continual flow of liquid into the urinal bowl, fill level measuring should be provided which when the maximum fill level of the intermediate storage device has been reached opens the shut-off valve 10 and provides a storage device expansion by the effectively usable storage device volume 24. When the maximum fill level 22 has been reached, the suction process, which involves closing the shut-off valve 10 and opening the suction valve 17, is activated. The storage device volume 32 and 31 can be designed to reflect the maximum possible volume flow in the drain conduit 36. To provide an odor seal, installations such as a ball-type odor seal, membrane odor seal etc. in the drain conduit 26 are possible.

A further measure of preventing the urinal bowl 2 from overflowing when the sieve 9 and/or the drain 25 is/are blocked involves automatic closing of the flush valve 6 when a maximum fill level in the urinal bowl has been registered. Registration can be implemented with the use of a fill level sensor, as used in the fill-level measuring device 33, at the intermediate storage device 32.

The system can also be operated as a "waterless urinal". In that case, positions 3, 4, 5 and 6 concerning flushing are not required. The geometry of the urinal bowl should support gravity-driven draining of liquids at the surface of the urinal bowl. Furthermore, an anti-adhesive surface coating to support the draining behaviour should be used in the urinal bowl.

On the drain 25, the draining system according to the invention with the first connection device 101 is connected. The second connection device 102 is let into the drain system 200 at position 29, but it can also be let in at any other position, provided, on the one hand a corresponding necessary gradient is maintained, and on the other hand a location in the drain system, which location is prone to blockage, is bridged. For example, the inlet can also be at position 28, i.e. just upstream of the suction valve 17.

Details of the draining system having an odor seal have been described above with reference to FIG. 1; for the sake of clarity they are not explained anew at this point.

Figure 3:
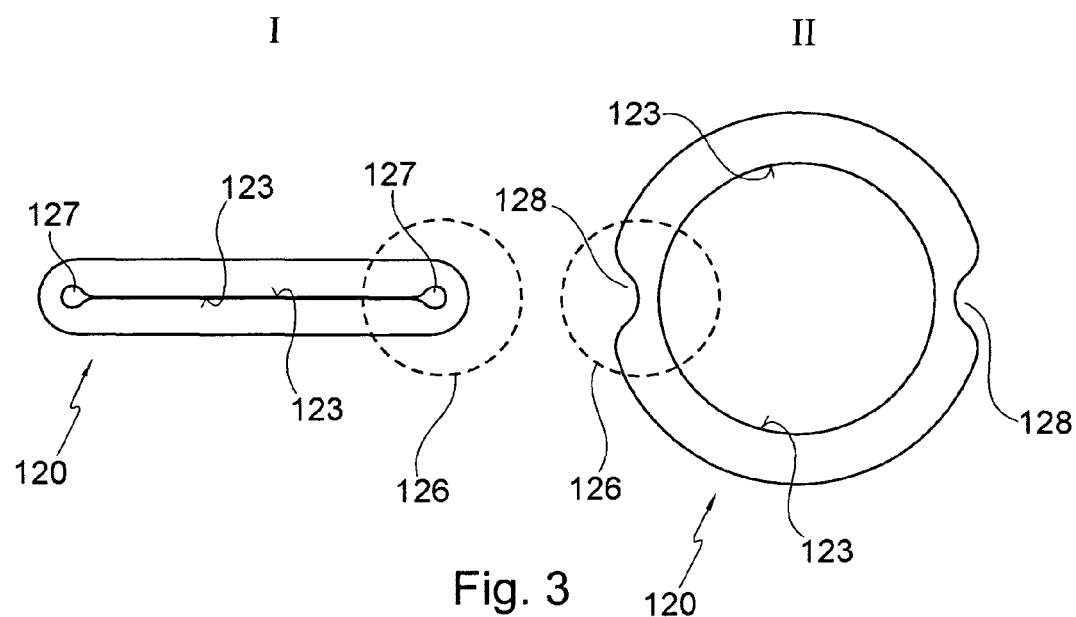
FIG. 3 shows an exemplary embodiment of a hose in a first cross-sectional shape and in a second cross-sectional shape.

FIG. 3 shows a first cross-sectional shape I and a second cross-sectional shape II of a hose cross section of an odor seal in an exemplary embodiment of the draining system according to the invention. In the first cross-sectional shape I the two opposing interior wall surfaces 123 lie on top of each other such that the hose cross section is essentially sealed off. Only small gussets 127 may remain, in which, however, as a rule, residual liquid collects that is retained in those locations by capillary action so that hermetic sealing of the hose cross section in the first cross-sectional shape I is essentially ensured. If a liquid is present on the side of the inlet region 121 of the hose 120, the interior wall surfaces 123 are spaced apart from each other in such a manner that the liquid can pass through the hose 120.

The two interior wall surfaces 123 are connected to each other in a connection region 126. In such a connection region the wall thickness of the hose can, for example, be thinner as a result of a constriction 128 so that a predetermined buckling point is created, along which the hose collapses flat as planned, and is thus able to take up the first cross-sectional shape I in a defined manner.

However, the purpose of the hose is also achieved if the wall thickness is selected so as to be sufficiently thin for there to be adequate flexibility in the hose, with any folds in the hose being automatically aligned, in order to assume a sealing first cross-sectional shape I.

Figure 4:
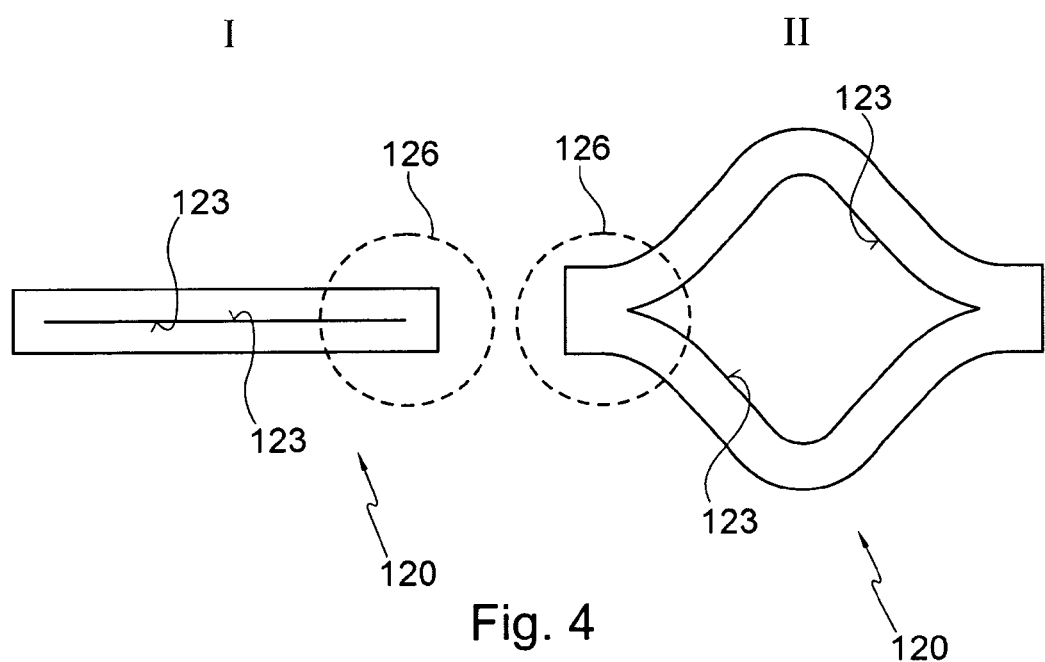
FIG. 4 shows a further exemplary embodiment of a hose in a first cross-sectional shape and in a second cross-sectional shape.

FIG. 4 shows a further possible cross-sectional geometry of a hose in an exemplary embodiment of the draining system according to the invention. In this arrangement the hose 120 is designed such that the two opposing interior wall regions 123 in their connection regions 126 lie on top of each other. Such a hose geometry can, for example, be obtained in that a strip-shaped body of hose material is cut in the middle along the direction of extension of the strip so that an elongated slit within the strip arises, wherein said slit is opened up, when a hydrostatic pressure of a liquid is present, from the first cross-sectional shape I to the second cross-sectional shape II, as is shown in FIG. 4.

Figure 5:
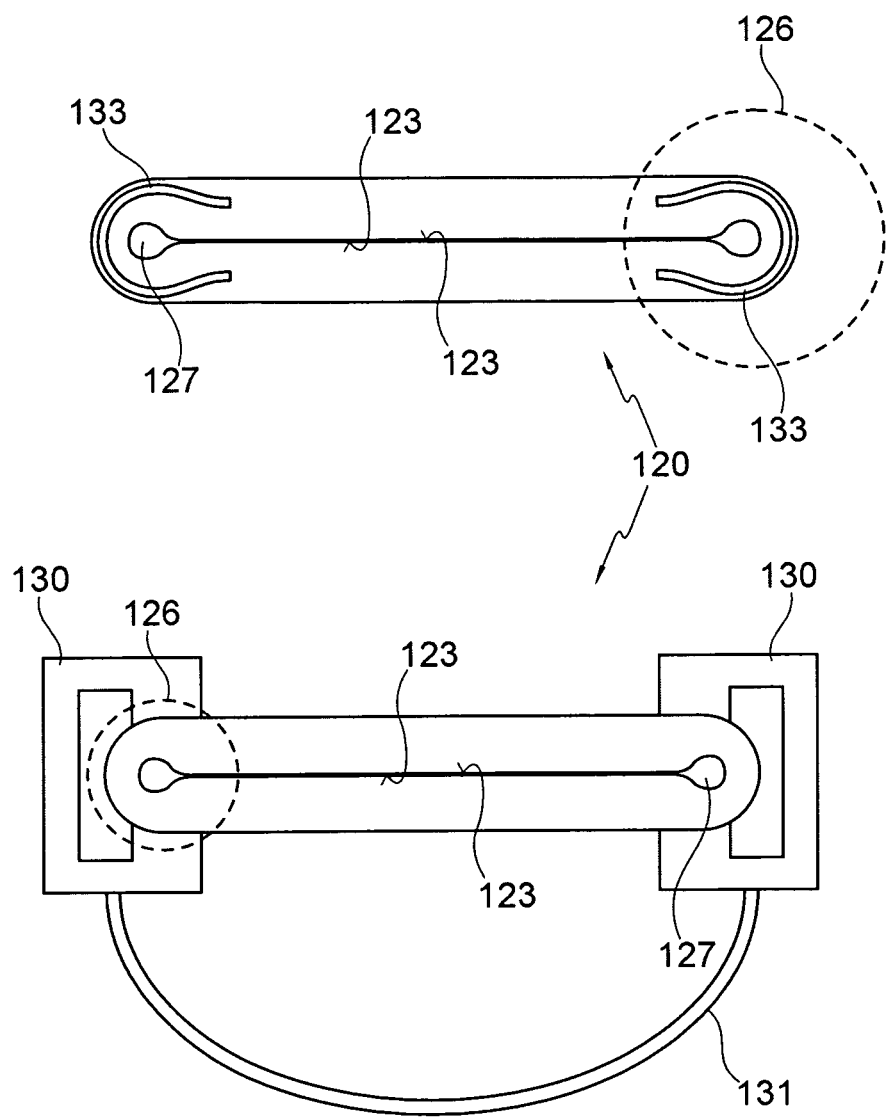
FIG. 5 shows exemplary embodiments of a clamped hose.

FIG. 5 shows clamping of a hose for a draining system according to an exemplary embodiment. In this arrangement the hose 120 is, at least in some sections, clamped by two clamping devices 130 in the connection region 126 of the two opposing interior wall regions 123 so that the hose 120 is compressed and in this way assumes a first cross-sectional shape I. By means of a bow 131 or a functionally similar device, the hose can be pre-tensioned across its longitudinal extension in order to achieve a certain pretension of the interior wall regions 123. In this way sealing and also squeezing of the hose 120 in the connection regions 126 can be achieved such that gussets 127 are no longer of a size sufficient to have any effect on the function of the draining system having an odor seal. Clamping can also be achieved by means of tension elements or spring elements 133 located in the hose wall, which tension elements or spring elements 133 have a function that is similar to that of the clamping devices 130.

Figure 6:
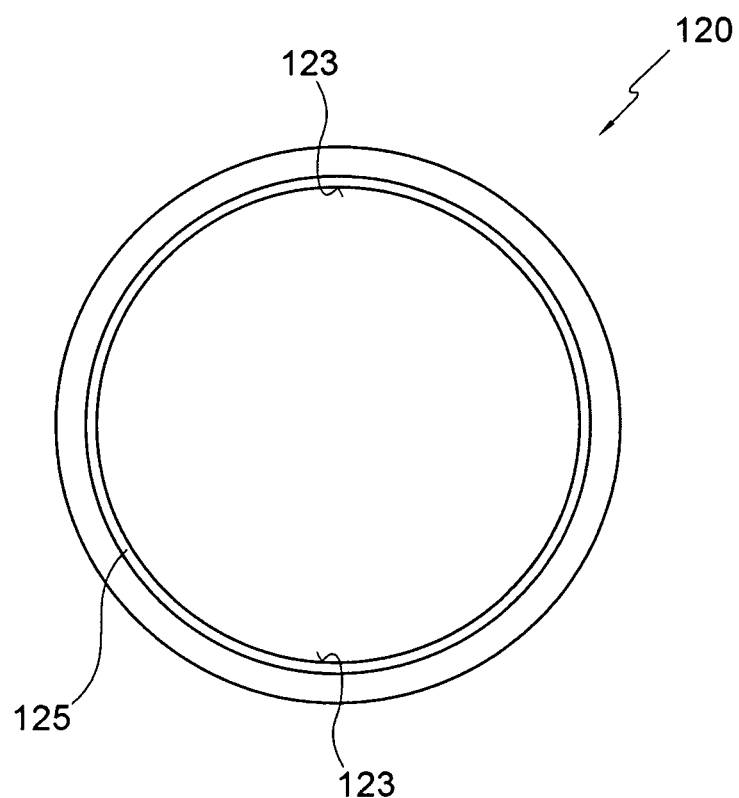
FIG. 6 shows an exemplary embodiment of a hose comprising an anti-adhesive coating.

FIG. 6 shows a cross-sectional view of a hose according to an exemplary embodiment of the draining system, wherein the hose 120 comprises a coating 125 that has an anti-adhesive effect. Furthermore, such a coating can also be hydrophobic so that particles in liquids, also in acids, alkaline solutions and salt water, do not adhere at all or only poorly so that the danger of dirt being deposited is greatly reduced. Such a coating can, for example, be provided in the region of the hose in which the two opposing interior wall regions 123 lie on top of each other in a first cross-sectional shape I.

Such a coating can also be applied to a segment of a circle only, for example if the purpose is only to stop the two opposing interior wall regions 123 from sticking together.

Figure 7:
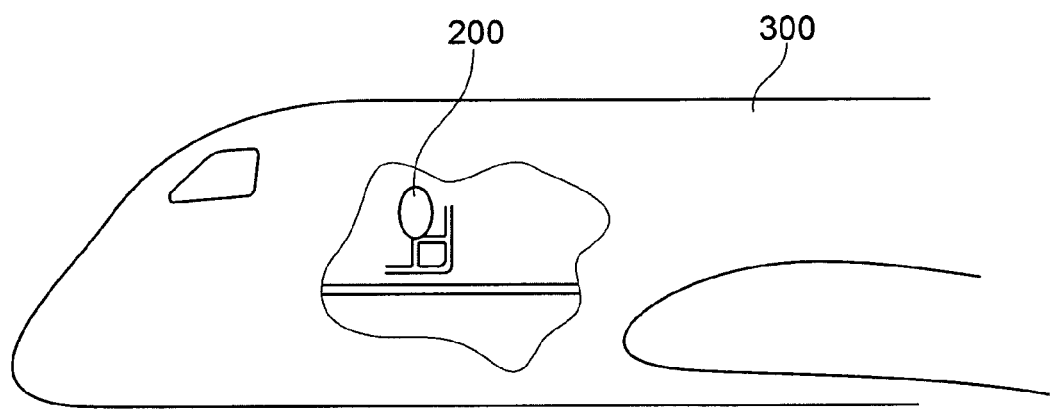
FIG. 7 shows an exemplary embodiment of an aircraft according to the present invention.

FIG. 7 shows an exemplary embodiment of an aircraft according to the present invention. In this arrangement a drain system 200 according to the invention can be provided in an aircraft, in particular in an aeroplane 300.

Figure 8:
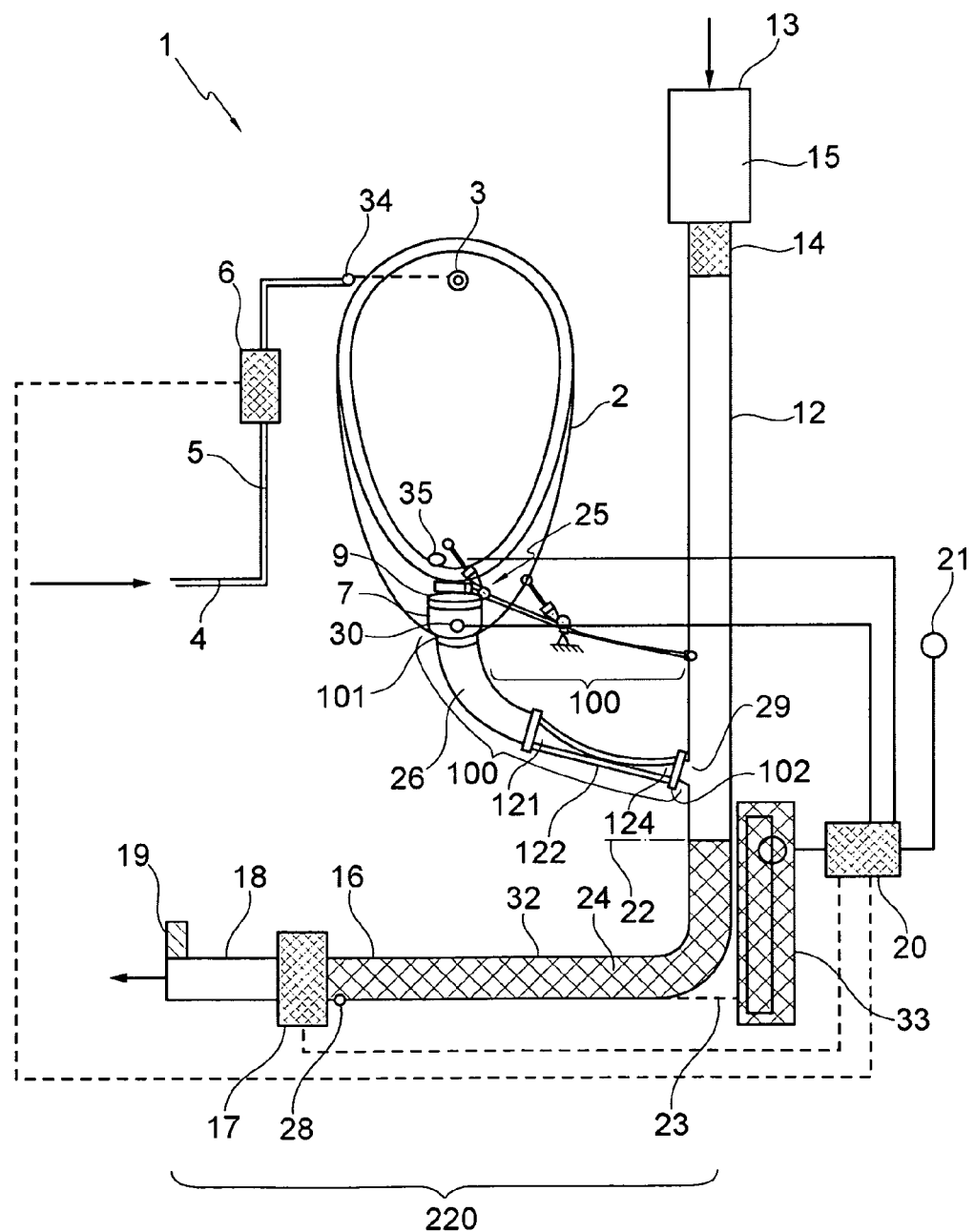
FIG. 8 shows an exemplary embodiment of a drain system comprising a draining system according to the invention, wherein the draining system acts both as an overflow and as a main drain.

FIG. 8 shows an exemplary embodiment of a drain system comprising a draining system 100 that is provided both as an overflow and as a main drain. The elements shown in FIG. 8 essentially correspond to those in FIG. 2. However, in this case the draining system 100 replaces the shut-off valve 10 from FIG. 2 in its function as an odor seal and a shut-off device. When used as a main drain, the draining system 100 should be dimensioned such that large mass flows can reliably be drained. The purely mechanical function of the draining system further increases the reliability of the system, in particular because there are no mechanical bearing arrangements in order to carry out opening and closing of the draining system. It should be understood that the draining system 100 according to the invention can, for example, also be used as an overflow, as has already been described with reference to FIG. 2. Although this is not explicitly shown in FIG. 8, the draining system 100 according to the invention can, for example, also be used only as a main drain. Due to its great reliability, it may even be possible to do without an overflow completely, because mechanical malfunction of a closing device 10 that is now being done without is no longer to be expected.

It should be noted that none of the drawings and figures are to scale and in particular that the ratio of hose circumference to thickness of the hose wall is not shown to scale in the figures.

Although the invention has been described above with reference to a preferred exemplary embodiment, various alterations and modifications can be made without leaving the scope of protection of the invention.

The invention can also be used in fields other than that of aviation, for example in trains or ships, where vacuum toilets are also used, and where the problem of reducing noise emission exists.

The terms "comprising", "having" etc. do not exclude the presence of other elements. The term "a" or "one" does not exclude a plural number.

Reference characters in the claims are provided for improved legibility; they are not intended to limit the protective scope of the claims in any way.

The invention claimed is:

1. A draining system for a vacuum toilet drain system for an aircraft, wherein the draining system comprises:
   a first connection device for connection to a drain;
   a second connection device for the downstream connection to a drain system; and
   an odor seal arranged between the first connection device and the second connection device;
   wherein the odor seal comprises a flexible hose with an inlet region, a middle region with two opposing interior wall regions, and an outlet region, wherein the cross-sectional middle region of the hose, both in a state where there is no pressure difference between the inlet region and the outlet region, and in a negative-pressure state in the outlet region, is present in a first cross-sectional shape in which the two interior wall regions lie on top of each other such that the cross-sectional geometry substantially does not permit a gas exchange, and the hose, as a result of an upstream hydrostatic pressure of the liquid, is configured to be brought from the first cross-sectional shape to a second cross-sectional shape in which the two interior wall regions are, at least in part, spaced apart from each other such that the passing of liquid in the downstream direction is made possible,
   wherein the outlet region of the flexible hose is connected to the second connection device,
   wherein the hose is configured such that the first cross-sectional shape is taken up as a result of the intrinsic weight of the hose,
   wherein the flexible hose is inclined between the first connection device and the second connection device, and
   wherein the weight of the flexible hose is adapted to force opposing interior wall surfaces of the flexible hose towards one another.

2. The draining system of claim 1, wherein the hose comprises a material selected from the group consisting of Teflon, latex, silicone, caoutchouc or a mixture thereof.

3. The draining system of claim 1, further comprising a liquid feed-in upstream of the middle region for feeding a flushing liquid for flushing the middle region.

4. The draining system of claim 1, wherein at least one of the two opposing interior wall regions, at least in some sections, comprises an anti-adhesive coating.

5. The draining system of claim 4, wherein the coating is a fluid sliding agent.

6. The draining system of claim 1, wherein the hose is configured such that the first cross-sectional shape is at least in part assumed by pre-tension in at least one part of the hose cross section.

7. The draining system of claim 1, wherein in the middle region the two opposing interior wall regions are connected in lateral connection regions such that they lie on top of each other in the connection regions.

8. The draining system of claim 1, wherein in the middle region the hose is elastic and laterally clamped in order to assume the first cross-sectional shape.

9. The draining system of claim 1, further comprising:
   a drain pipe system with a first connection that can be connected to a bowl of a vacuum toilet, and a second connection that can be connected to a vacuum system; and
   a drain connection for the second connection device of the draining system, which drain connection is provided in a downstream direction in front of the second connection.

10. The drain system of claim 9, further comprising a closing device in the drain pipe system between the first connection and the second connection, wherein the drain connection for the second connection device is provided downstream behind the closing device.

11. The drain system of claim 9, wherein the draining system is provided as an overflow.

12. The drain system of claim 9, wherein the draining system is provided as a main drain.

13. A vacuum toilet comprising a draining system, the draining system comprising:
- a first connection device for connection to a drain;
- a second connection device for the downstream connection to a drain system; and
- an odor seal arranged between the first connection device and the second connection device;
- wherein the odor seal comprises a flexible hose with an inlet region, a middle region with two opposing interior wall regions, and an outlet region, wherein the cross-sectional middle region of the hose, both in a state where there is no pressure difference between the inlet region and the outlet region, and in a negative-pressure state in the outlet region, is present in a first cross-sectional shape in which the two interior wall regions lie on top of each other such that the cross-sectional geometry substantially does not permit a gas exchange, and the hose, as a result of an upstream hydrostatic pressure of the liquid, can be brought from the first cross-sectional shape to a second cross-sectional shape in which the two interior wall regions are, at least in part, spaced apart from each other such that the passing of liquid in the downstream direction is made possible,
- wherein the outlet region of the flexible hose is connected to the second connection device,
- wherein the hose is configured such that the first cross-sectional shape is taken up as a result of the intrinsic weight of the hose,
- wherein the flexible hose is inclined between the first connection device and the second connection device, and
- wherein the weight of the flexible hose is adapted to force opposing interior wall surfaces of the flexible hose towards one another.

14. The vacuum toilet of claim 13, wherein the vacuum toilet comprises a urinal.

15. An aircraft with a toilet or a urinal comprising a draining system comprising:
- a first connection device for connection to a drain;
- a second connection device for the downstream connection to a drain system; and
- an odor seal arranged between the first connection device and the second connection device;
- wherein the odor seal comprises a flexible hose with an inlet region, a middle region with two opposing interior wall regions, and an outlet region, wherein the cross-sectional middle region of the hose, both in a state where there is no pressure difference between the inlet region and the outlet region, and in a negative-pressure state in the outlet region, is present in a first cross-sectional shape in which the two interior wall regions lie on top of each other such that the cross-sectional geometry substantially does not permit a gas exchange, and the hose, as a result of an upstream hydrostatic pressure of the liquid, can be brought from the first cross-sectional shape to a second cross-sectional shape in which the two interior wall regions are, at least in part, spaced apart from each other such that the passing of liquid in the downstream direction is made possible,
- wherein the outlet region of the flexible hose is connected to the second connection device,
- wherein the flexible hose is inclined between the first connection device and the second connection device,
- wherein the hose is configured such that the first cross-sectional shape is taken up as a result of the intrinsic weight of the hose, and
- wherein the weight of the flexible hose is adapted to force opposing interior wall surfaces of the flexible hose towards one another.

* * * * *